(12) United States Patent
Asthana et al.

(10) Patent No.: US 10,503,946 B2
(45) Date of Patent: Dec. 10, 2019

(54) PROCESSING MACHINE-READABLE LINK

(71) Applicant: HEWLETT-PACKARD DEVELOPMENT COMPANY, L.P., Houston, TX (US)

(72) Inventors: Prashant Asthana, Bangalore (IN); Rajesh Bhatia, Bangalore (IN); Amrenda Kumar, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/747,731

(22) PCT Filed: Oct. 28, 2015

(86) PCT No.: PCT/IN2015/050150
§ 371 (c)(1),
(2) Date: Jan. 25, 2018

(87) PCT Pub. No.: WO2017/072778
PCT Pub. Date: May 4, 2017

(65) Prior Publication Data
US 2018/0225493 A1    Aug. 9, 2018

(51) Int. Cl.
*G06K 7/14*   (2006.01)
*G06K 7/10*   (2006.01)

(52) U.S. Cl.
CPC ............ *G06K 7/1473* (2013.01); *G06K 7/10* (2013.01); *G06K 7/10722* (2013.01); *G06K 7/1417* (2013.01)

(58) Field of Classification Search
CPC . G06K 7/1473; G06K 7/1417; G06K 7/10722
See application file for complete search history.

(56) References Cited

U.S. PATENT DOCUMENTS

| | | | |
|---|---|---|---|
| 7,578,444 B2 | 8/2009 | Joseph et al. | |
| 8,915,445 B1 | 12/2014 | Mincher et al. | |
| 8,944,313 B2 | 2/2015 | Williams et al. | |
| 9,092,683 B2 | 7/2015 | Koziol et al. | |
| 2003/0057282 A1* | 3/2003 | Brandt | G06K 7/14 235/462.07 |

(Continued)

FOREIGN PATENT DOCUMENTS

| CN | 1402231187 A | 2/2008 |
|---|---|---|
| CN | 101296441 A | 10/2008 |

(Continued)

OTHER PUBLICATIONS

"Motionix™ Motion-Sensing Technology"; Datalogic: Feature Overview; Jan. 13, 2014.

*Primary Examiner* — Laura A Gudorf
(74) *Attorney, Agent, or Firm* — HP Inc. Patent Department

(57) ABSTRACT

Approaches and devices for processing a machine-readable link in the event of a failed scan are described. In one example, the processing may alter an image attribute corresponding to each image within the set of images, process the set of images with the altered image attribute to ascertain presence of the machine-readable link; and obtain an operational indication, wherein the operational indication is to aid a user of a computing system for subsequently scanning another machine-readable link.

19 Claims, 6 Drawing Sheets

(56) References Cited

U.S. PATENT DOCUMENTS

| | | | |
|---|---|---|---|
| 2005/0082370 A1* | 4/2005 | Frantz | G06K 9/3241 |
| | | | 235/462.25 |
| 2009/0322489 A1 | 12/2009 | Jones et al. | |
| 2010/0327066 A1 | 12/2010 | Khan | |
| 2011/0068173 A1* | 3/2011 | Powers | G06K 7/14 |
| | | | 235/462.06 |
| 2012/0018508 A1* | 1/2012 | Kindberg | G06F 16/9554 |
| | | | 235/375 |
| 2013/0022231 A1* | 1/2013 | Nepomniachtchi | G06Q 20/042 |
| | | | 382/102 |
| 2015/0363625 A1* | 12/2015 | Wu | G06K 7/146 |
| | | | 382/203 |

FOREIGN PATENT DOCUMENTS

| | | |
|---|---|---|
| CN | 104219582 A | 12/2013 |
| CN | 104410790 A | 3/2015 |

\* cited by examiner

PROCESSING MACHINE-READABLE LINK

BACKGROUND

Printed content on a document, either textual or image-based, may be provided with machine-readable links which may be read optically using an image capture device, coupled to a computing system. Each of such machine-readable links may be encoded or associated with various types of information (also referred to as payload). Such information in turn may supplement or complement the content of the printed document. Examples of such links include one- or two-dimensional barcodes, digital watermarks, image fingerprints, image watermarks, QR codes, and the like. Interaction with such machine-readable links allows any user to access information encoded within the respective machine-readable links. The information may subsequently be provided for access on the computing device being used by the user.

BRIEF DESCRIPTION OF THE DRAWINGS

The following detailed description references the drawings, wherein.

DETAILED DESCRIPTION

Figure 1:
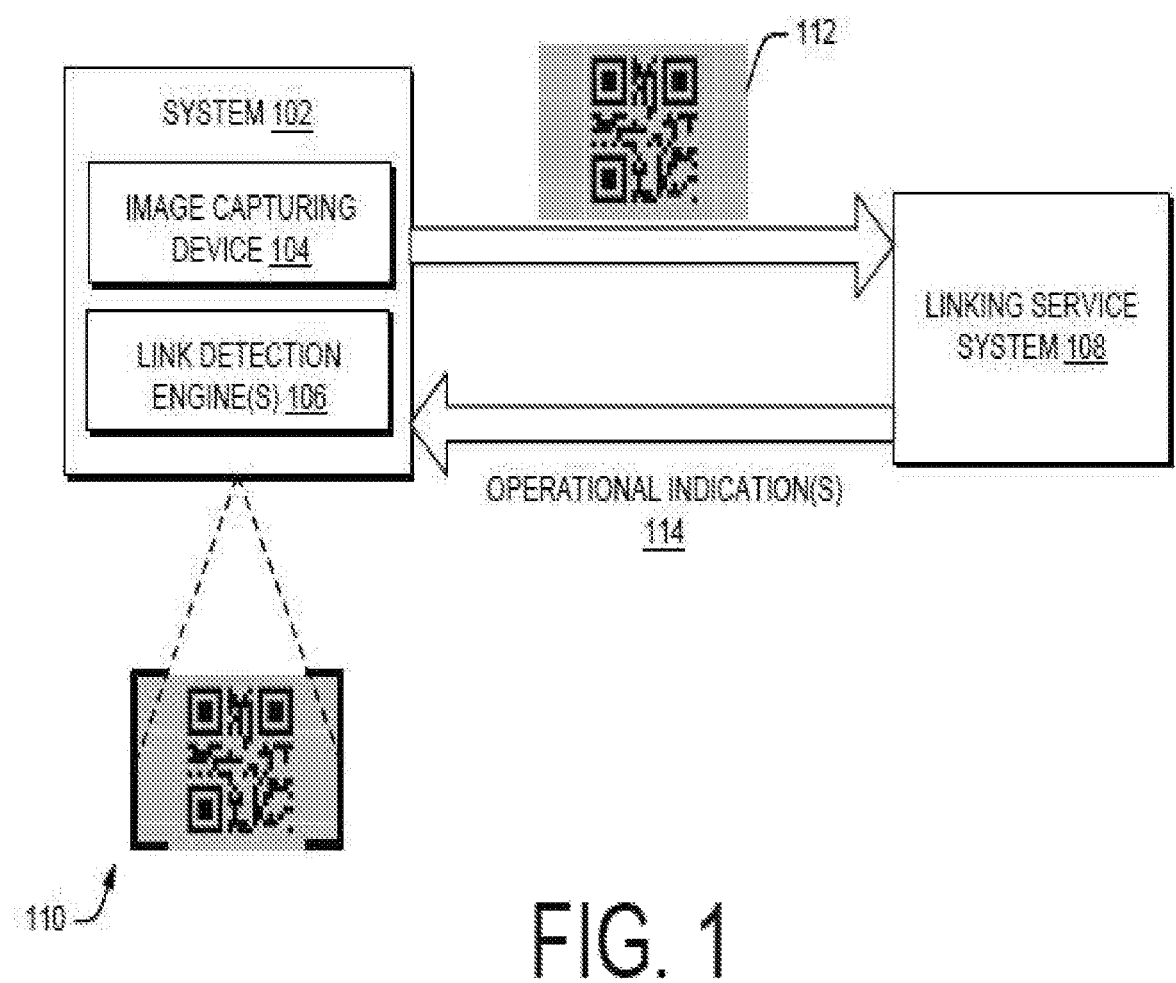
FIG. 1 is a block diagram of an example system to process a machine-readable link in the event of a failed scan.

Printed medium has so far been one mechanism for distribution of content. The printed content may be made available as a document or in any printed form by which textual or image-based content may be distributed. However, the extent and the amount of information that may be conveyed are limited by the area of the printed document on which content is printed. In some cases, the printed content may further include one or more machine-readable links. Such machine-readable links, when optically read by a computing system, may be decoded by the computing system to allow access to additional information via a communication network. The decoding of the machine-readable link may also be carried out by a linking service system implemented remotely from the computing system. Examples of such computing systems include, but are not limited to, smartphones, tablet PCT, handheld devices, and the like.

Generally, in order to access the additional information linked with the machine-readable links, a computing system with an image capturing device is brought in proximity to the machine-readable link and an image of the machine-readable link is captured or scanned. Once captured, the image of the machine-readable link may be resolved by the computing system, and the additional content which may be associated with the machine-readable link may be provided to the user. Resolving any machine-readable link may be understood as returning or providing content-specific information linked with the machine-readable link to a user, when such link is interacted with or captured using devices such as the computing systems. A payoff may be considered as any information which is obtained upon capturing an image of machine-readable link and fetching information linked to, or embedded within, such a machine-readable link. The content may include text, images, an audio-visual clip, or a URL.

In some cases, the machine-readable link may not get properly captured when a user is attempting to scan the machine-readable link. The failure to scan the machine-readable link may occur due to various factors, such as viewing distance from the machine-readable link or the illumination of the surface on which the machine-readable link is provided. This may also be dependent on the quality of the machine-readable link itself. For example, the image captured may be blurry if the machine-readable link itself has deteriorated. In some other cases, the hardware capabilities of the computing system and its image capturing device may not be suitable for capturing appropriate images of the machine-readable link, and hence require some changes in the settings of the image capturing device so that a suitable image may be captured. Furthermore, it may also be the case that the user may not be operating the computing system in an appropriate manner. For example, the user may be positioning the computing system too close to the machine-readable link, thereby preventing the image capturing device to focus and clearly capture an image of the machine-readable link.

Approaches for processing a machine-readable link in the event of a failed scan, are described. In one example, processing a machine-readable link in the event of a failed scan may be implemented using a computing system, such as a smartphone, tablet, or the like. Such computing systems may also be coupled with an image capturing device. The image capturing device may be integrated within a computing system or may be connected to the computing system through a wired or wireless medium. The image capturing device is utilized for scanning the machine-readable link and capturing an image of the machine-readable link.

In operation, the computing system attempts to determine whether a user is intending to capture or scan a machine-readable link. In one example, the computing system may initially determine whether a link detection engine installed on the computing system has been activated by the user. Once the link detection engine has been activated, the computing system may further determine whether the computing system is in a state of motion or not. For example, in an attempt to scan a machine-readable link, the user may move the computing system so as to bring the computing system in proximity to the machine-readable link. Thereafter, the user may hold the computing system steady so as to focus on the machine-readable link, in order to initiate scanning.

Once it is determined that one or more link detection engines are actively executing on the computing system, a timer is activated. During the time period when the timer is active, the user may be positioning the computing system in such a way so as to scan a machine-readable link. While the computing system scans a surface area for a machine-readable link which may be present, the image capturing device captures and obtains a set of images of the scanned area. In the present example, the images are captured without receiving any input from the user of the computing system. The images are captured intermittently till the timer expires. The images may be alternatively obtained from a video clip captured by the computing system. In such an example, the computing system may process the video clip to obtain the set of images.

During the time period when the timer is active, the computing system also actively determines whether a machine-readable link is present or not. For example, one or more image recognition algorithms may be used for detecting whether a machine-readable link is being scanned or not. On not detecting the machine-readable link till the timer expires, the computing system may communicate the captured set of images to a linking service system.

The linking service system on receiving the captured image may process the captured set of images to detect the machine-readable link which may be present. In one example, the linking service system may process the image by altering one or more image attributes corresponding to the set of images. Examples of image attributes include, but are not limited to, brightness, contrast, gamma value, color saturation, and sharpness. The different image attributes of each of the set of images may be altered, and accordingly, the images may be processed to detect whether a machine-readable link was present in the set of images which were captured.

Once any machine-readable link is detected, the linking service system may proceed further and process the set of images to resolve the machine-readable link. Upon resolving, content associated with the machine-readable link is obtained and communicated to the user. The content may include text, images, an audio-visual clip, or a URL. In one example, the linking service system may further generate one or more operational indications. The operation indications may be considered as any indications which may aid the user for subsequently scanning any other machine-readable link so that such machine-readable links are detected by the computing system itself.

Operational indications may be generated as text messages which are then transmitted to the computing system. In one example, such operational indications may also include one or more settings which may be installed on the computing system. Once installed, the operational indications may define one or more operating settings of the computing device. The generated operational indications are communicated to the computing system of the user. Depending on the operational indications, the user may alter the manner in which any surface is scanned for machine-readable link or may also change the operating settings of the computing system used for scanning.

In the manner as described above, machine-readable link which otherwise may not be detected by a computing device owing to either the manner in which the computing system was operated or due to the limitations of its hardware, may be captured and processed. Furthermore, the present approaches also allow for the computing system and the user to receive operational indications which may be used for improving either the manner in which the machine-readable link is to be captured, or by modifying one or more operating settings of the computing system prior to interacting with any other machine-readable links in future.

These and other aspects are described in conjunction with one or more computing based devices as illustrated in FIGS. 1-6. FIG. 1 illustrates an example system 102 to process a machine-readable link 110 in the event of a failed scan process. In the present example, the system 102 includes an image capturing device 104 and link detection engine(s) 106. The system 102 may be implemented as a computing device. The system 102 may be in further communication with a remotely implemented linking service system 108. The linking service system 108 may further include a data repository (not shown in FIG. 1), either coupled to or integrated within the linking service system 108. In operation, the system 102 may be used for scanning and resolving one or more machine-readable links, such as the machine-readable link 110. It should be noted that resolving the machine-readable link 110 may involve decoding the information associated with machine-readable link 110 and providing such information to the system 102. Resolving any machine-readable link may be understood as returning or providing pay-off which is content-specific information linked with the machine-readable link to a user, when such link is interacted with or captured. A payoff may be considered as any information which is obtained upon capturing an image of machine-readable link and fetching information linked to, or embedded within, such a machine-readable link. The content may include text, images, illustrations, audio, video, or a URL.

In operation, a user of the system 102 may attempt to scan a machine-readable link, such as the machine-readable link 110 using the image capturing device 104. The machine-readable link 110 may be provided on surface area, which in turn is scanned by the image capturing device 104. Scanning a link may be considered as any activity in which a computing system, such as the system 102, is being used to read or detect one or more machine-readable links. While scanning, one or more link detection processes may be executing on the system 102, which would enable sensing of the machine-readable link 110.

As the link detection processes are running, in parallel, the link detection engine(s) 106 may initiate a timer. It should be noted that execution of such link detection processes may be considered as indicative of the fact that the user of the system 102 is intending to scan a machine-readable link 110. The timer is active for a time period during which it is expected that the system 102 would be able to detect the machine-readable link 110. Furthermore, during the time period when the timer is active, the user may also be positioning the system 102 in such a way so as to scan a machine-readable link 110. While the system 102 scans a surface area for a machine-readable link 110 which may be present, the image capturing device 104, coupled to the system 102, obtains and captures a set of images of the scanned area for the time duration the timer is active. In the present example, the images are captured without receiving any input from the user of the system 102. The images are captured intermittently till the timer expires.

During the time period when the timer is active, the system 102 also actively determines whether the machine-readable link 110 has been detected or not. For example, linking service system 108 may be implemented using one or more image recognition algorithms for detecting the machine-readable link 110. Based on whether the machine-readable link 110 is detected (or not detected by the link detection engine(s) 106), further actions for detecting and resolving the machine-readable link 110 may be carried out. The monitoring of whether the machine-readable link 110 has been detected or not may be carried out till the timer has expired or not. If the timer expires, and it is determined that the machine-readable link 110 has not yet been detected, the link detection engine(s) 106 may collate the set of images. The set of images, depicted as image(s) 112 may then be transmitted to the linking service system 108.

The linking service system 108 on receiving the set of image(s) 112 (referred to as image(s) 112) may alter one or more image attributes for the corresponding set of images.

As would be understood, the image attributes may be altered so as to improve the quality of the image(s) 112 received from the system 102. Once the image attributes have been altered, the linking service system 108 may further process the image(s) 112 to detect and resolve the machine-readable link 110 (captured in the set of images). Additionally, the linking service system 108 may also generate one more operational indication(s) 114. The operational indication(s) 114 are instructions in any form which may aid the user to either operate the system 102 or may provide certain settings which can be installed on the system 102. The generated operational indication(s) 114 may then be transmitted to the system 102. In one example, the content obtained by the linking service system 108 upon resolving of the machine-readable link 110, is provided to the system 102. In one example, the operational indication(s) 114 may provide one or more guiding inputs for suggested position for the system 102 for scanning the machine-readable link 110. The operational indication(s) 114 may also indicate that one or more operating settings of the image capturing device 104, such as the contrast or brightness settings may be changed.

Figure 2:
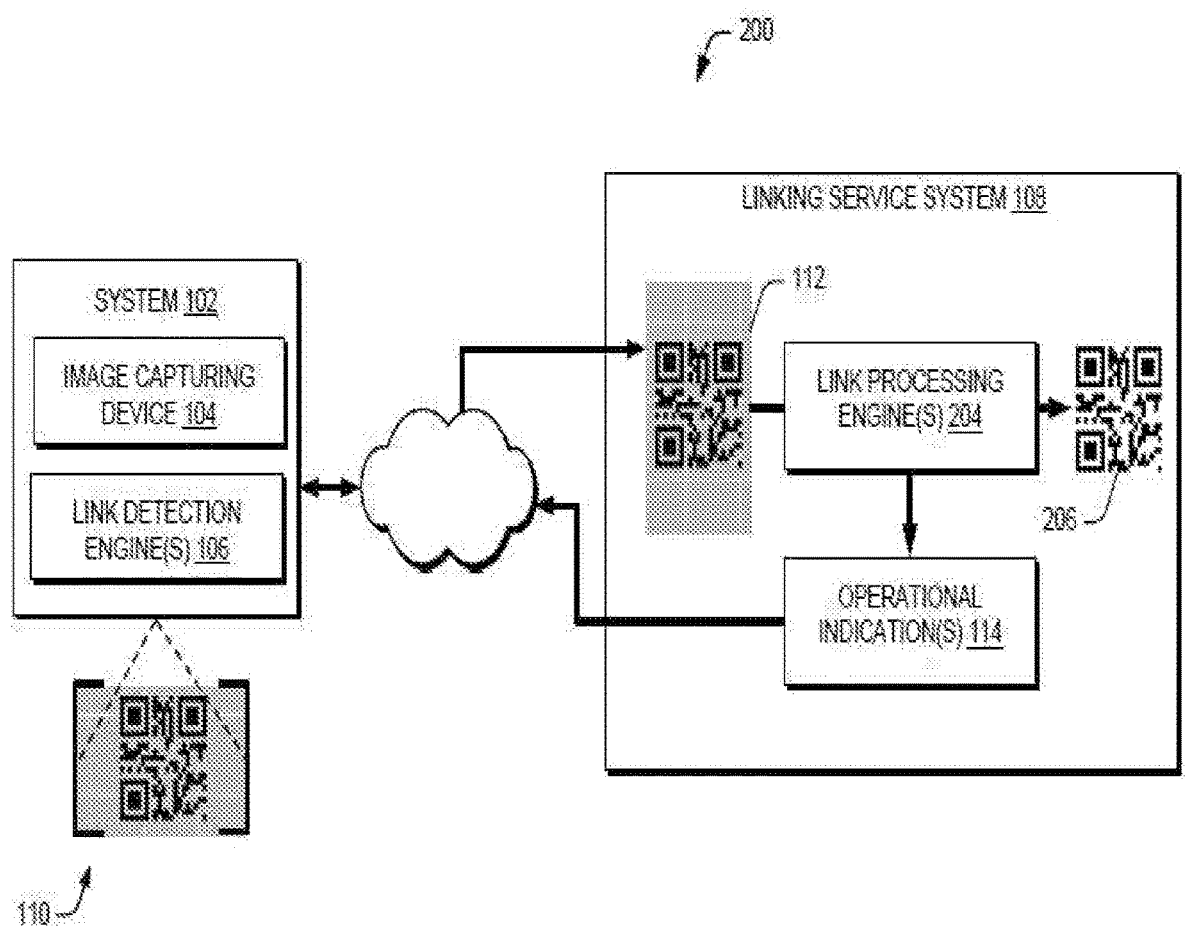
FIG. 2 is a networked environment implementing an example system to process a machine-readable link in the event of a failed scan.

FIG. 2 provides a network environment 200 for depicting the system 102 communicatively coupled to the linking service system 108, along with their respective components as per an example of the present subject matter. The environment 200 includes the system 102 which in turn further includes image capturing device 104 and link detection engine(s) 106. The system 102 may be in communication with linking service system 108 over a communication network 202 (referred to as network 200). The network 202 may include, for example, a local area network (LAN), a wireless local area network (WLAN), a virtual private network (VPN), the Internet, or the like, or a combination thereof. In some examples, a computer network may include a telephone network (for example, a cellular telephone network). The linking service system 108 may also include link processing engine(s) 204.

As explained in conjunction with FIG. 1, it may be the case that the system 102 is not able to detect the machine-readable link 110. The system 102 may have failed at detecting the machine-readable link 110 because of a variety of reasons, such as environmental reasons, condition of the machine-readable link 110, settings of the image capturing device 104 not appropriate, and so on. Each of such conditions may result in the machine-readable link 110 not being detected by the system 102. In FIG. 2, as per an example, it is depicted that the machine-readable link 110 is blurred for which reason, the system 102 was unable to detect the machine-readable link 110. The blurring is illustrated by way of shading. As would also be understood, other aspects as described above, may also be present without deviating from the scope of the present subject matter.

Returning to the working of the system 102, the image capturing device 104 of the system 102 may intermittently capture a set of images, i.e., image(s) 112, while attempting to detect the machine-readable link 110. If after a certain time period, the system 102 is unable to detect the machine-readable link 110, the system 102 may transmit the image(s) 112 to the linking service system 108, over the communication network 202. The images may be alternatively obtained from a video clip recorded by the image capturing device 104. In such an example, the system 102 processes the video clip to obtain the image(s) 112. Within the system 102, link detection engine(s) 106 may process the video clip to provide the image(s) 112.

The image(s) 112 received from the system 102, are further processed by the link processing engine(s) 204. While processing, the link processing engine(s) 204 may determine one or more image attributes of the image(s) 112. Examples of such image attributes include, but are not limited to, brightness, contrast, gamma value, color saturation and sharpness. It should be noted that the present exemplification is only indicative and other types of attributes may also be considered without deviating from the scope of the present subject matter.

While processing, the link processing engine(s) 204 may alter one or more image attributes of the image(s) 112. The altering of the image(s) 112 is intended for making such image(s) 112 more discernible when processed by one or more link detection algorithms. Continuing with the operation of the link processing engine(s) 204, the link processing engine(s) 204 may continuously alter the image attribute till the image(s) 112 reach a desired quality. For example, image attributes associated with each of the image(s) 112 may be measurable based on a value. For the image(s) 112, the link processing engine(s) 204 may determine the value of the corresponding image attributes, and may change one or more values of the image attributes till the altered values reach a predefined threshold. As illustrated in FIG. 2, the link processing engine(s) 204 may alter the image attributes so as to provide the altered image 206. The altered image 206, as depicted in FIG. 2, is shown to be clearer as a result of the alterations of its corresponding image attributes.

Once the image attribute values of the image(s) 112 have been altered, the link processing engine(s) 204 may further process any one or more of the image(s) 112 to detect and process the machine-readable link 110. For example, in the case of the machine-readable link 110 being a bar-code or a QR code, the link processing engine(s) 204 may utilize one or more edge detection techniques to detect the machine-readable link 110. In one example, the link processing engine(s) 204 may be implemented using one or more cloud-based resources. Utilizing cloud-based resources would allow processing of machine-readable link 110 using better computational resources, and thereby increase the likelihood of the machine-readable link 110 being detected and resolved by the link processing engine(s) 204.

Once the machine-readable link 110 has been detected, the link processing engine(s) 204 may determine the alterations that have been affected onto the image(s) 112. As would be understood, the machine-readable link 110 in the image(s) 112 is made detectable as a result of the alterations performed by the link processing engine(s) 204. In one example, the link processing engine(s) 204 may generate one or more operational indication(s) 114 based on the alterations affected onto the image(s) 112. The operational indication(s) 114 may be understood as one or more indications which may aid the user, such as the user of the system 102, to successfully scan the machine-readable link 110 using the machine-readable link 110.

The operational indication(s) 114 may be provided as text-based or image-based instructions which can be later transmitted to the system 102. In such cases, the operational indication(s) 114 may list out one or more suggested operating procedures which may be followed by the user for successfully scanning the machine-readable link 110. For example, the operational indication(s) 114 may provide one or more guiding inputs for suggested position for the system 102 for scanning the machine-readable link 110. The operational indication(s) 114 may also provide one or more suggested changes to the operation settings of the system 102. In such a case, the operational indication(s) 114 may indicate that the contrast or brightness settings of an image capturing device (coupled to the system 102) may be changed, for example, before the machine-readable link 110 can be scanned.

In yet another example, the operational indication(s) 114 may be one or more executable instructions or settings generated by the link processing engine(s) 204. For example, the link processing engine(s) 204 may generate executable operational indication(s) 114 installable on the system 102. Such settings when installed on the system 102 may affect one or more changes to the operation settings of the system 102. In another example, the generation of the operational indication(s) 114 may be further based on alterations carried on previously available image(s) 112. In such an example, the alterations carried out on previous sets of image(s) 112 may be obtained. Such historical information regarding the alterations performed on the previous image(s) 112, may also be used by the link processing engine(s) 204 for generation of the operational indication(s) 114. The operational indication(s) 114 once generated by the link processing engine(s) 204, are subsequently transmitted to the system 102 over the communication network 202. The operational indication(s) 114 once received by the system 102 may be assimilated by the user or may be installed on the system 102, so that subsequent attempts on scanning of other machine-readable links, may be successful.

Figure 3:
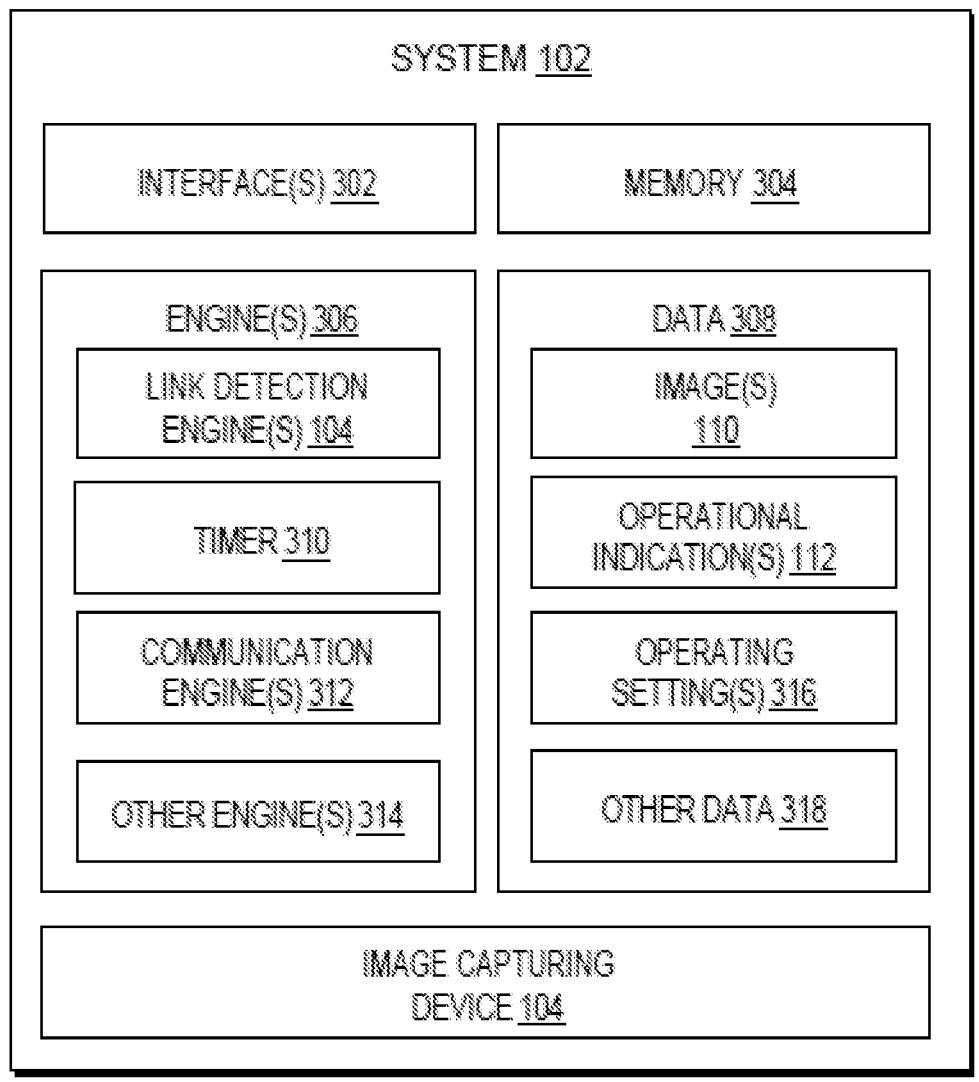
FIG. 3 is a block diagram of another example system to process a machine-readable link in the event of a failed scan.

FIG. 3 illustrates an example system 102 for processing a machine-readable link in the event of a failed scan. The system 102 may be implemented as a standalone computing system communicatively connected through a network (for example, network 202) to other devices. The system 102 includes interface(s) 302 and memory 304. The interface(s) 302 may include a variety of interfaces, for example, interfaces for data input and output devices, referred to as I/O devices, storage devices, network devices, and the like. The interface(s) 302 facilitate communication between the system 102 and various computing devices connected in a networked environment, such as environment 200.

The memory 304 may store one or more computer-readable instructions, which may be fetched and executed so as to cause to provide access to digital content using a machine-readable link 110. The memory 304 may include any non-transitory computer-readable medium including, for example, volatile memory such as RAM, or non-volatile memory such as EPROM, flash memory, and the like.

The system 102 may further include engine(s) 306, data 308 and image capturing device 104. The image capturing device 104 may be any image capturing device such as a camera or a web-cam which can be coupled to the system 102. The image capturing device 104 may be coupled to the system 102 via wired or wireless means. In case of smartphones or other such devices, the image capturing device 104 may also be integrated within the electronic circuitry of the system 102. The image capturing device 104 may be programmed to scan and capture images of a surface area where a machine-readable link, such as the link 110, is present.

The engine(s) 306 may be implemented as a combination of hardware and programming (for example, programmable instructions) to implement one or more functionalities of the engine(s) 306. In examples described herein, such combinations of hardware and programming may be implemented in a number of different ways. For example, the programming for the engine(s) 306 may be processor executable instructions stored on a non-transitory machine-readable storage medium and the hardware for the engine(s) 306 may include a processing resource (for example, one or more processors), to execute such instructions. In the present examples, the machine-readable storage medium may store instructions that, when executed by the processing resource, implement engine(s) 306. In such examples, the system 102 may include the machine-readable storage medium storing the instructions and the processing resource to execute the instructions, or the machine-readable storage medium may be separate but accessible to system 102 and the processing resource. In other examples, engine(s) 306 may be implemented by electronic circuitry.

The data 308 includes data that is either predefined or generated as a result of the functionalities implemented by any of the engine(s) 306. In an example, the engine(s) 306 include link detection engine(s) 106, timer 310, communication engine(s) 312 and other engine(s) 314. The other engine(s) 314 may implement functionalities that supplement applications or functions performed by the system 102. Further, the data 308 may include image(s) 112, operational indication(s) 114, operating setting(s) 316 and other data 318. The other data 318 may include data generated and saved by the engine(s) 306 for implementing various functionalities of the system 102.

The system 102 implements one or more processes for processing a machine-readable link in the event of a failed scan. In one example, the system 102 may initially determine whether one or more applications for scanning and resolving a machine-readable link, such as the link 110, are executing. Such applications may have been initiated or activated by a user of the system 102, intending to scan and resolve the machine-readable link 110. In parallel, the system 102 may activate the timer 310. The timer 310 is so configured such that it is active for a predefined time period. The predefined time period is determined based on time which would usually elapse from the instant the applications were activated to the instant when a machine-readable link is detected by the system 102, while scanning a surface area.

During the time period in which the timer 310 is active, the image capturing device 104 intermittently captures one or more images of surface area with the machine-readable link 110, being scanned. In one example, the image capturing device 104 may capture the images periodically, say after every 0.5 seconds. The captured images are saved as image(s) 112. The image capturing device 104 may continue to capture such images till the timer 310 expires. The images may be obtained from a video clip captured by the image capturing device 104 of the system 102. In such an example, the link detection engine(s) 106 of the system 102 may process the video clip to obtain the image(s) 112.

While the image capturing device 104 is being used for scanning and capturing the images of the surface area with the machine-readable link 110, the linking service system 108 may attempt to detect such a present machine-readable link 110. As discussed earlier, the link detection engine(s) 106 may not be able to detect the machine-readable link 110 because of a variety of factors, namely, improper manner of operating the system 102, improper settings of the system 102, incorrect stance of the user while holding the system 102 to scan the machine-readable link 110, and the like.

The monitoring for the machine-readable link 110 may continue till the timer 310 is active. Once the timer 310 expires, the link detection engine(s) 106 may conclude that no machine-readable link 110 was detected. On the expiry of the timer 310, the link detection engine(s) 106 may further communicate the image(s) 112 to a central repository coupled to a linking service system 108 (as illustrated in FIGS. 1-2). In one example, the communication engine(s) 312 may establish a communication channel with linking service system 108. The communication channel may be implemented over a communication network such as the network 202.

Once the communication channel is established, the communication engine(s) 312 may transmit the image(s) 112 to the linking service system 108. As also explained in conjunction with FIGS. 1-2, the linking service system 108 may further process the image(s) 112 for processing a machine-readable link 110 in the event of a failed scan. For example, the link processing engine(s) 204 in the linking service system 108 may alter one or more image attributes associated with the image(s) 112. The altered image may be processed again to detect the machine-readable link 110. In one example, the image attributes may be altered repeatedly till the image(s) 112 are of a desired quality. Thereafter, the link processing engine(s) 204 may further process the machine-readable link 110 to resolve the same, and obtain the content associated therein. The content may then be communication to the system 102, say over the network 202.

As also discussed, the link processing engine(s) 204 may subsequently generate one or more operational indication(s) 114. The operational indication(s) 114 are to aid a user of the system 102 for subsequently scanning any other machine-readable links. The operational indication(s) 114 may be in the form of either text-based instructions or messages intended to the user, or may be implemented as executable instructions for installing on the system 102. In one example, the operational indication(s) 114 may provide one or more guiding inputs for suggested position for the system 102 for scanning the machine-readable link 110. The operational indication(s) 114 may also indicate that one or more operating settings of the image capturing device 104, such as the contrast or brightness settings may be changed. The operational indication(s) 114 are transmitted to the system 102.

On receiving the operational indication(s) 114, the system 102 may store in the same in data 308. In one example, the link detection engine(s) 106 may determine whether any operational indication(s) 114 are present. The link detection engine(s) 106 may also compare operating setting(s) 316 of image capturing device 104 with the operational indication(s) 114. If the operational indication(s) 114 are not in conformance with the operating setting(s) 316, the link detection engine(s) 106 may generate a notification for the user to change the operating setting(s) 316 of the image capturing device 104 in accordance with the operational indication(s) 114.

In another implementation, the operational indication(s) 114 may be in the form of executable instructions. Once received, the operational indication(s) 114 may be executed by the link detection engine(s) 106. The operational indication(s) 114 may upon their execution affect changes to the operating setting(s) 316. For example, upon execution of the operational indication(s) 114, one or more operating setting(s) 316 such as brightness control or contrast control of the system 102 may be modified based on the operational indication(s) 114. As would be understood, one or more operating setting(s) 316 of the system 102 may be dynamically changed, so that the likelihood of the system 102 detecting any other machine-readable link is increased.

Figure 4:
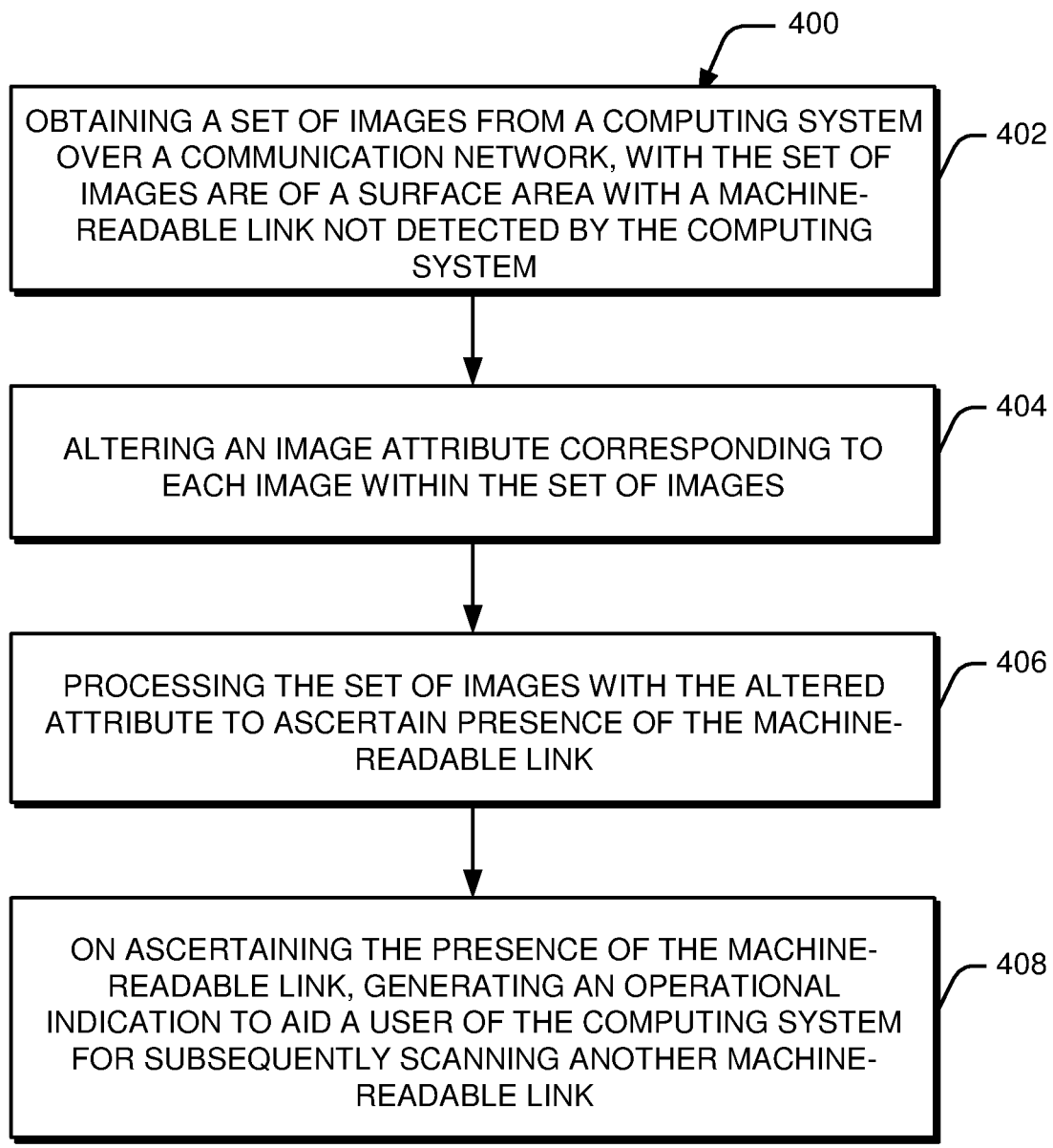
FIG. 4 is a flowchart of an example method for processing a machine-readable link in the event of a failed scan.
Figure 5:
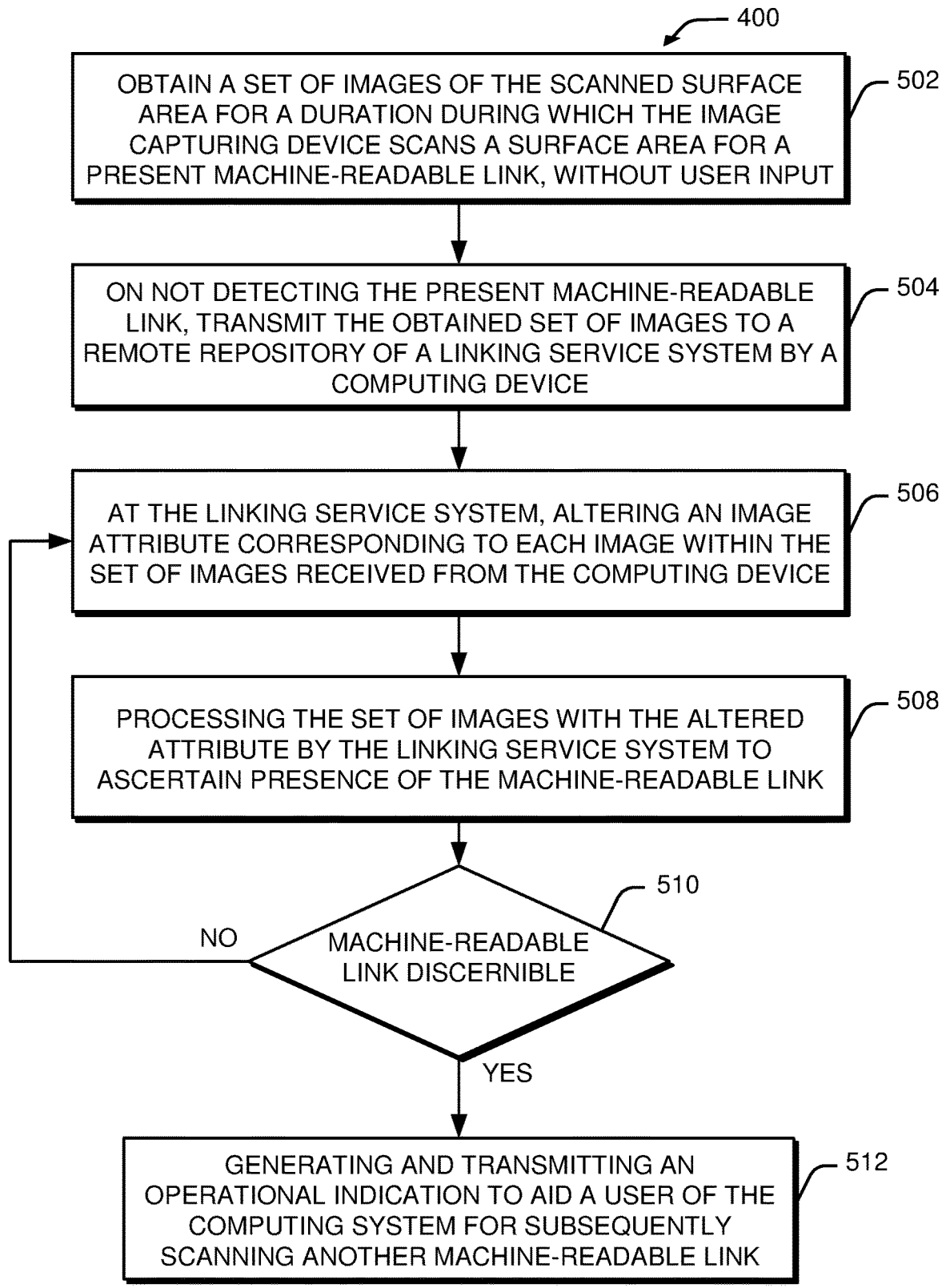
FIG. 5 is a flowchart of another example method for processing a machine-readable link in the event of a failed scan.

FIGS. 4-5 illustrate example methods 400 and 500, respectively, to detect a machine-readable link, according to an implementation of the present subject matter. The order in which the methods are described is not intended to be construed as a limitation, and any number of the described method blocks may be combined in any order to implement the aforementioned methods, or an alternative method. Furthermore, methods 400 and 500 may be implemented by processing resource or computing device(s) through any suitable hardware, non-transitory machine readable instructions, or combination thereof.

It may also be understood that methods 400 and 500 may be performed by programmed computing devices, such as system 102 as depicted in FIGS. 1-3. Furthermore, the methods 400 and 500 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The methods 400 and 500 are described below with reference to system 102 as described above; other suitable systems for the execution of these methods may also be utilized. Additionally, implementation of these methods is not limited to such examples.

Returning to FIG. 4, at block 402, a set of images from a computing system over a communication network, are obtained. The set of images include images of a surface area with a machine-readable link not detected by the computing system. For example, image(s) 112 are received from the system 102. The system 102 through its image capturing device 104 captures one or more image(s) 112 of the surface area which includes a machine-readable link, such as the link 110, which was not detected. The image(s) 112 are captured if the machine-readable link 110 is not detected for a predefined time interval. Once the image(s) 112 are captured by the image capturing device 104, the communication engine(s) 312 of the system 102 transmits the image(s) 112 to the linking service system 108. In one example, the images may be alternatively obtained from a video clip recorded by the image capturing device 104.

At block 404, one or more image attributes of the corresponding set of images are altered. For example, one or more image attributes of the image(s) 112 are altered by the link processing engine(s) 204. Examples of such image attributes include, but are not limited to, brightness, contrast, gamma value, color saturation and sharpness. In one example, the link processing engine(s) 204 may continuously alter the image attribute till the image(s) 112 reaches a desired quality. In the present example, the link processing engine(s) 204 may continuously evaluate values of the image attributes to determine whether the image is now of a desirable quality.

At block 406, the set of images with the altered attribute are yet processed to ascertain presence of the machine-readable link. For example, once the image attribute values of the image(s) 112 have been altered, the link processing engine(s) 204 may further process the image to process and resolve the machine-readable link 110. This is explained with respect to an example, where the machine-readable link 110 is a bar-code or a QR code. In such a case, the link processing engine(s) 204 may utilize one or more edge detection techniques to detect the machine-readable link 110, and ascertain that the machine-readable link 110 is a barcode. The further process of the image(s) 112 may be may be carried out using one or more cloud-based resources associated with the linking service system 108. Utilizing cloud-based resources would allow processing of machine-readable link 110 using better computational resources, and thereby increase the likelihood of the machine-readable link 110 being detected and resolved by the link processing engine(s) 204.

At block 408, on ascertaining the presence of the machine-readable link, operational indications are generated based on the alterations which had been affected to the set of images. As explained in light of previous examples, the operational indication may be any indication which is likely to aid a user of the computing system for subsequently scanning another machine-readable link. In one example, on detecting the machine-readable link 110, the link processing engine(s) 204 may determine the alterations that have been affected onto the image(s) 112. The link processing engine(s) 204 may generate one or more operational indication(s) 114 based on the alterations affected onto the image(s) 112. The operational indication(s) 114 may be provided as text-based or image-based instructions which can be later transmitted to the system 102. The operational indication(s) 114 may also provide one or more suggested changes to the operation settings of the system 102. In such a case, the operational indication(s) 114 may indicate that perhaps the contrast or brightness settings of an image capturing device 104 (coupled to the system 102) may be changed before the machine-readable link 110 can be scanned.

FIG. 5 provides a method 500 for processing a machine-readable link in the event of a failed scan. At block 502, a set of images of a scanned area having a machine-readable link, is obtained, without any user input. For example, the set of images may have been captured by image capturing device 104 coupled to system 102, which in turn s being used by a user to detect and resolve a machine-readable link, such as the link 108. In the present example, the system 102 on determining whether one or more applications for resolving the machine-readable link 110, are executing may activate timer 310. The timer 310 is expected to expire after a time period during which is any one or more machine-readable link can be detected by the system 102. The system 102, as per the present example, continues to monitor whether a machine-readable link has been detected or not. Furthermore, during the time period when the timer 310 was active, the image capturing device 104 may capture one or more images of the surface area being scanned intermittently and without any input from the user.

At block 504, on not detecting any machine-readable link in the scanned area, the set of images are transited to a remote repository of a linking service system. In one example, on not detecting any machine-readable link, the communication engine(s) 312 may establish a communication channel with the linking service system 108. The communication channel may be established over the communication network 202.

At block 506, the set of images are received by the linking service system. At the linking service system, one or more image attributes are altered. In one example, the link processing engine(s) 204 may alter one or more image attributes of the image(s) 112 so as to make such image(s) 112 more discernible when processed by one or more link detection algorithms.

At block 508, the set of images with the altered attribute are processed to ascertain presence of the machine-readable link. For example, once the image attribute values of the image(s) 112 have been altered, the link processing engine(s) 204 may further process the image to process and resolve the machine-readable link 110. In another example, the link processing engine(s) 204 may utilize one or more image processing algorithms for analyzing the image(s) 112 to detect the presence of the machine-readable link 110.

At block 510, a further assessment is made to determine whether the machine-readable link under consideration is discernible or not. If it is determined, that the machine-readable link 110 is not discernible ('No' path from block 510) the method proceeds back to block 506 where the image attributes of the corresponding image(s) 112 are altered by the link processing engine(s) 204. Once the alterations are affected, the image(s) 112 may be processed yet again to determine whether the machine-readable link 110 is discernible or not (loop to block 510).

If however, the link processing engine(s) 204 is able to detect the machine-readable link 110 ('Yes' path from block 510), the link processing engine(s) 204 generates one or more operational indication(s) 114. The link processing engine(s) 204 may determine the alterations that have been affected onto the image(s) 112. The link processing engine(s) 204 may generate one or more operational indication(s) 114 based on the alterations affected onto the image(s) 112 (block 512). The operational indication(s) 114 may be provided as text-based or image-based instructions which can be later transmitted to the system 102. The operational indication(s) 114 may also provide one or more suggested changes to the operation settings of the system 102. In another example, the operational indication(s) 114 may list out one or more suggested operating procedures which may be followed by the user for successfully scanning the machine-readable link 110. The operational indication(s) 114 may also provide one or more suggested changes to the operation settings of the system 102. In yet another example, the operational indication(s) 114 may be one or more executable instructions or settings generated by the link processing engine(s) 204.

Figure 6:
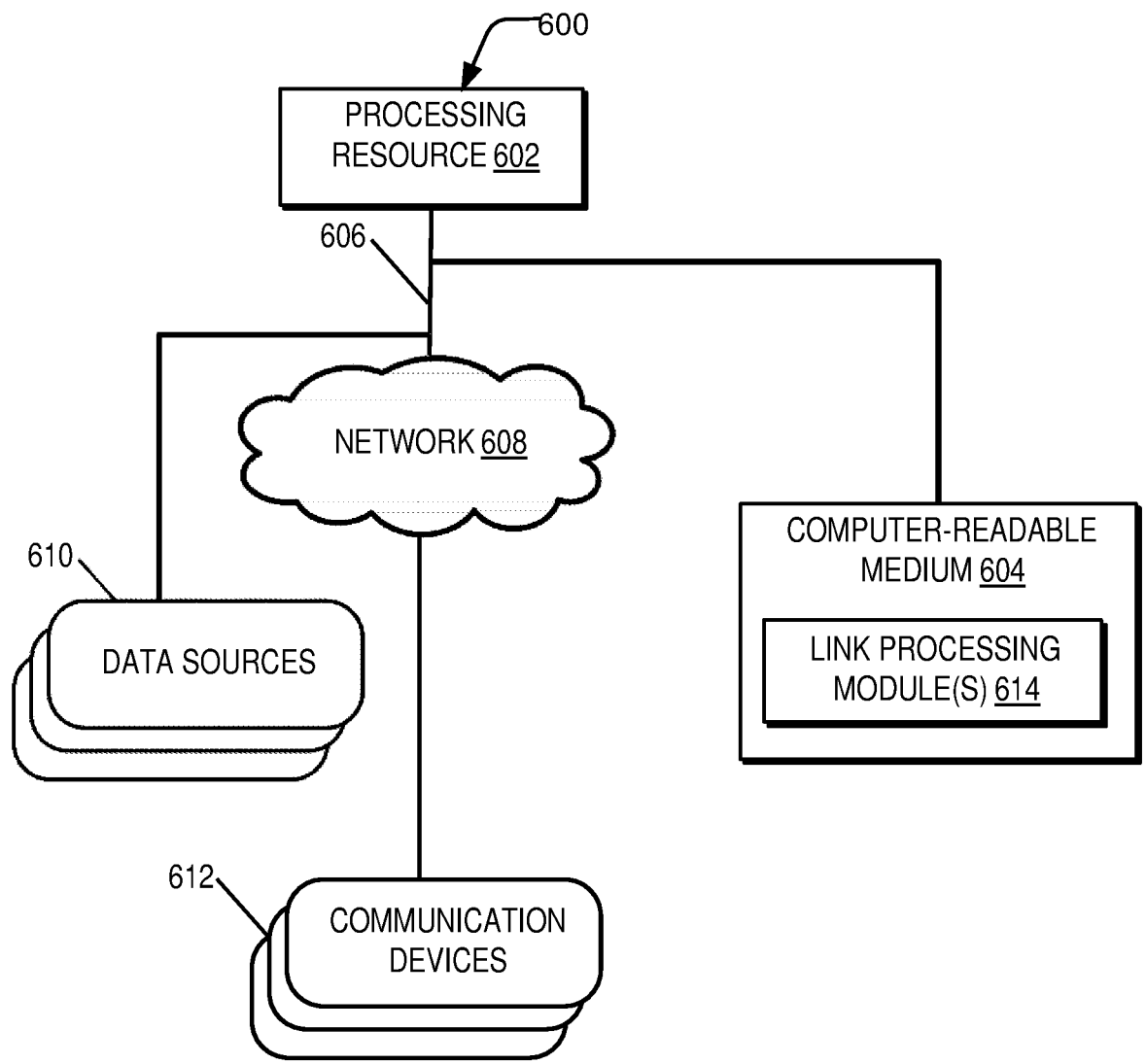
FIG. 6 is a block diagram of an example system implementing a non-transitory computer-readable medium, to process a machine-readable link in the event of a failed scan.

FIG. 6 illustrates a system environment 600 for processing a machine-readable link in the event of a failed scan, according to an example of the present disclosure. The system environment 600 may comprise at least a portion of a public networking environment or a private networking environment, or a combination thereof. In one implementation, the system environment 600 includes a processing resource 602 communicatively coupled to a computer readable medium 604 through a communication link 606.

For example, the processing resource 602 can include one or more processors of a computing device for processing a machine-readable link in the event of a failed scan. The computer readable medium 604 may be, for example, an internal memory device of the computing device or an external memory device. In one implementation, the communication link 606 may be a direct communication link, such as any memory read/write interface. In another implementation, the communication link 606 may be an indirect communication link, such as a network interface. In such a case, the processing resource 602 can access the computer readable medium 604 through a network 608. The network 608 may be a single network or a combination of multiple networks and may use a variety of different communication protocols.

The processing resource 602 and the computer readable medium 604 may also be coupled to data sources 610 through the communication link 606, and/or to communication devices 612 over the network 608. The coupling with the data sources 610 enables in receiving the data in an offline environment, and the coupling with the communication devices 612 enables in receiving the data in an online environment.

In one implementation, the computer readable medium 604 includes a set of computer readable instructions, implementing a link processing module(s) 614. The link processing module(s) 614 may, in one example, be executable code for processing a machine-readable link in the event of a failed scan. The set of computer readable instructions within computer readable medium 604 may be accessed by the processing resource 602 through the communication link 606 and subsequently executed to process data communicated with the data sources 610 in order to detect a machine-readable link.

In one example, link processing module(s) 614 receives image(s) 112 from the system 102. The image(s) 112 may have been captured by an image capturing device 104 coupled to the system 102. In the present example, one or more corresponding image attributes of the image(s) 112 are determined by the link processing module(s) 614. Examples of such image attributes include, but are not limited to, brightness, contrast, gamma value, color saturation and sharpness.

While processing, the link processing module(s) 614 may alter or modify one or more image attributes of the image(s) 112. In another example, the link processing module(s) 614 may continuously alter the image attribute till the image(s) 112 reach a desired quality. Once the image attribute values of the image(s) 112 have been altered, the link processing module(s) 614 may further process the image to detect and process the machine-readable link 110.

On detecting the machine-readable link 110, the link processing module(s) 614 may determine the alterations that have been affected onto the image(s) 112 based on which one or more operational indication(s) 114 are generated. The operational indication(s) 114 may be understood as one or more indications which may aid the user, such as the user of the system 102, to successfully scan the machine-readable link 110 using the machine-readable link 110. The operational indication(s) 114 may be provided as text-based or image-based instructions which can be later transmitted to the system 102. In another example, the link processing module(s) 614 may generate operational indication(s) 114 as executable instructions for installation of one or more settings on the system 102. Once generated, the link processing module(s) 614 may transmit the operational indication(s) 114 to the system 102.

Although examples for the present disclosure have been described in language specific to structural features and/or methods, it should stood that the appended claims are not necessarily limited to the specific features or methods described. Rather, the specific features and methods are disclosed and explained as examples of the present disclosure.

We claim:

1. A system comprising:
   an image capturing device including circuitry; and
   a link detection engine including circuitry coupled to the image capturing device, wherein the link detection engine is to:
   for a duration during which the image capturing device scans a surface area for a present machine-readable link, without user input, obtain a set of images of the scanned surface area;
   monitor whether a machine-readable link present on the scanned surface area is detected;
   on not detecting the present machine-readable link, transmit the obtained set of images to a remote repository of a linking service system for detecting and resolving the present machine-readable link; and
   in response to transmitting the set of images, receive operational indications from the linking service system to aid a user of the system for subsequently scanning the surface area for another machine-readable link.

2. The system as claimed in claim 1, wherein to obtain the set of images, the link detection engine is to:
   capture a video clip for the duration during which the image capturing device scans the surface for the present machine-readable link; and
   process the video clip to obtain the set of images.

3. The system as claimed in claim 1, wherein the link detection engine is to further receive payoff associated with the machine-readable link, from the linking service system.

4. The system as claimed in claim 1, where the operation indications include one of:
   suggested changes to operating settings of the image capturing device; and
   suggested positions for positioning the image capturing device away from the surface area, for scanning the present machine-readable link.

5. The system as claimed in claim 1, wherein the operational indications are in the form of installable settings for configuring the image capturing device of the system.

6. The system as claimed in claim 1, wherein the image capturing device is integrated within the system.

7. The system as claimed in claim 1, wherein responsive to the image capturing device scanning a surface area, the link detection engine is to process the captured image to determine a patterned representation of the set of images.

8. The system as claimed in claim 7, wherein attributes of the patterned representation of the set of images include a color histogram.

9. A method comprising:
   obtaining a set of images from a computing system over a communication network, wherein the set of images is of a surface area with a machine-readable link not detected by the computing system;
   altering an image attribute corresponding to each image within the set of images;
   processing the set of images with the altered image attribute to ascertain presence of the machine-readable link; and
   on ascertaining the presence of the machine-readable link, generating an operational indication, wherein the operational indication is to aid a user of the computing system for subsequently scanning another machine-readable link.

10. The method as claimed in claim 9, wherein the image attribute includes brightness, contrast, gamma value, color saturation and sharpness.

11. The method as claimed in claim 10, wherein the method further comprises:
    implementing repeated alterations to the image attribute until the presence of the machine-readable link is ascertained;
    capturing the repeated alterations of the image attribute; and
    generating the operational indication based on the repeated alterations.

12. The method as claimed in claim 9, wherein the operational instructions include instructions executable on the computing system, which when executed configure at least one operational setting of the computing system.

13. The method as claimed in claim 9, wherein the method further comprises, on ascertaining the presence of the machine-readable link:
    resolving the machine-readable link captured in the set of images;
    based on the resolving, determining content corresponding to the machine-readable link; and
    transmitting the determined content to the computing system over the communication network.

14. The method as claimed in claim 13, wherein the content is one of text, images, an audio-visual clip, and a URL.

15. The method as claimed in claim 9, wherein the operational indication is additionally based on alterations carried out on the image attribute for historically captured other sets of images.

16. A non-transitory computer-readable medium comprising instructions executable by a processing resource to:
- obtain a set of images from a computing system over a communication network, wherein the set of images is of a surface area with a machine-readable link not detected by the computing system;
- process the set of images to alter an image attribute corresponding to the set of images; and
- on determining the presence of the machine-readable link, generating installable operational instructions which when installed configure operating parameters of computing system.

17. The computer-readable medium as claimed in claim 16, wherein the machine-readable link is one of a barcode, a digital watermark, a Quick Response (QR) code and an optically readable image.

18. The method as claimed in claim 9, wherein an image attribute of a subsequent image is compared with an image attribute of a previous image to determine a reference image attribute.

19. The method as claimed in claim 9, wherein responsive to a deviation between an image attribute of a subsequent image and an image attribute of a previous image exceeding a predefined threshold, the computing system determines the subsequent image to be different from the previous image, and the computing system uploads the subsequent image.

* * * * *